United States Patent
Shi et al.

(10) Patent No.: US 8,429,731 B2
(45) Date of Patent: Apr. 23, 2013

(54) AUTHENTICATION BYPASS METHOD

(75) Inventors: Thomas Shi, Rochester Hills, MI (US); Hiroaki Shibata, Novi, MI (US); Koji Shinoda, Farmington Hills, MI (US); Wan-ping Yang, Farmington Hills, MI (US); Mustafa Mahmoud, Farmington, MI (US); Yi Jiang, Southfield, MI (US); Hyunju Seo, Northville, MI (US)

(73) Assignees: DENSO International America, Inc., Southfield, MI (US); Denso Corporation, Kariya-shi (JP)

( * ) Notice: Subject to any disclaimer, the term of this patent is extended or adjusted under 35 U.S.C. 154(b) by 504 days.

(21) Appl. No.: 12/748,963

(22) Filed: Mar. 29, 2010

(65) Prior Publication Data

US 2011/0239285 A1    Sep. 29, 2011

(51) Int. Cl.
    *G06F 7/04*    (2006.01)
(52) U.S. Cl.
    USPC ............................................................. 726/7
(58) Field of Classification Search .................. 726/7, 8, 726/9; 455/432.1, 434; 701/36
    See application file for complete search history.

(56) References Cited

U.S. PATENT DOCUMENTS

| | | | |
|---|---|---|---|
| 7,548,744 B2* | 6/2009 | Oesterling et al. | 455/411 |
| 7,894,795 B1* | 2/2011 | Dunne et al. | 455/406 |
| 2004/0259524 A1* | 12/2004 | Watkins et al. | 455/405 |
| 2005/0136892 A1* | 6/2005 | Oesterling et al. | 455/411 |
| 2010/0009659 A1* | 1/2010 | Netanel et al. | 455/411 |

* cited by examiner

*Primary Examiner* — Samson Lemma
(74) *Attorney, Agent, or Firm* — Harness, Dickey & Pierce, P.L.C.

(57) ABSTRACT

A method for reactivating a telematics device configured to make a data call via a roaming partner of a service provider is disclosed. The service provider has an authentication bypass feature which uses an authentication bypass key common to the telematics device and the service provider to allow the telematics device to make a data call without authentication. The method comprises setting the authentication bypass key on a server of the service provider equal to a previous authentication bypass key, wherein the previous authentication bypass key was used by the authentication bypass feature prior to deactivation of the telematics device. The method includes setting the authentication bypass key on the telematics device equal to the previous authentication bypass key. The method further comprises commencing the data call through the roaming partner by sending the authentication bypass key to the service provider from the telematics device via the roaming partner.

6 Claims, 6 Drawing Sheets

Figure 5

AUTHENTICATION BYPASS METHOD

FIELD

The present disclosure relates to a system and method for allowing a device to bypass authentication when in a roaming situation.

BACKGROUND

This section provides background information related to the present disclosure which is not necessarily prior art.

As automobile manufacturers continue to integrate telematics devices in automobiles, the trend is to provide the telematics devices with capabilities to make data calls. For instance, a data call may be made over a TDMA network. Traditionally, a data call will be made from a telematics device through a cellular network of the service provider. Thus, to make a data call, the telematics device is required to be in the service provider's coverage area or "footprint." Upon initiating a data call, the service provider authenticates the telematics device before providing service to the device. This typically requires a complex procedure to be performed between the server and the device.

As can be appreciated, however, telematics devices may routinely be outside of the service provider's footprint. In these situations, the telematics device can still make data calls via a third party service provider enlisted as a roaming partner of the service provider. In this scenario the data call is routed through one or more of the third party's servers to the service provider's server. An issue that arises in this situation, however, is that the telematics device still needs to be authenticated by the service provider. Because each service provider has its own proprietary methods for authenticating a device, authentication is a difficult task. Furthermore, as the data for authenticating the device is stored on the service provider's data servers, authenticating proves to be even more difficult.

SUMMARY

This section provides a general summary of the disclosure, and is not a comprehensive disclosure of its full scope or all of its features.

In one aspect, a method for reactivating a telematics device configured to make a data call via a roaming partner of a service provider is disclosed. The service provider has an authentication bypass feature which uses an authentication bypass key common to the telematics device and the service provider to allow the telematics device to make a data call through the roaming partner without authentication. The method comprises setting the authentication bypass key on a server of the service provider equal to a previous authentication bypass key, wherein the previous authentication bypass key was used by the authentication bypass feature prior to deactivation of the telematics device. The method further includes setting the authentication bypass key on the telematics device equal to the previous authentication bypass key. The method further comprises commencing the data call through the roaming partner by sending the authentication bypass key to the service provider from the telematics device via the roaming partner.

In a second aspect, a telematics device configured to make a data call via a roaming partner of a service provider is disclosed. The service provider has an authentication bypass feature which uses an authentication bypass key common to the telematics device and the service provider to allow the telematics device to make a data call through the roaming partner without authentication. The device comprises a communications module that receives a signal to reactivate the telematics device. The device further comprises a key generation module that sets the authentication bypass key of the telematics device equal to a previous authentication bypass key, wherein the previous authentication bypass key was used by the authentication bypass feature prior to deactivation of the telematics device, and wherein the service provider resets a corresponding authentication bypass key to the previous authentication bypass key. The device also includes an authentication bypass module that communicates the authentication bypass key to the roaming partner, wherein the service provider allows the telematics device to make the data call upon verifying that the authentication bypass key corresponds to the corresponding authentication bypass key.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to FIGS. 1-5 of the accompanying drawings. Described herein is a process for allowing authentication of a telematics device in a roaming situation. At the time of manufacturing of the telematics device, an "A-key," i.e. a key unique to the telematics device, is assigned to the device by the manufacturer and stored on a computer readable medium of the device. The A-key is also provided to the service provider. From the A-Key, an initial authentication bypass key can be generated from the A-Key using a predetermined algorithm. This initial authentication bypass key can be used by the telematics device to bypass the authentication requirement when the telematics device attempts to make a data call when in a roaming situation for the first time.

When the telematics device returns to the service provider's footprint, the telematics device can perform authentication using the service provider's authentication algorithm. Once authentication is performed, the service provider can generate a new authentication bypass key and communicate the new key to the device. It is appreciated that during the lifetime of the telematics device, authentication of the device may be performed multiple times as well as the generation and assignment of a new authentication bypass key. The current authentication bypass key is set to the newly assigned authentication bypass key and is used the next time the telematics device is in a roaming situation.

Upon deactivation of a device, e.g. the account for the device is discontinued, the service provider may remove the authentication bypass keys from its servers but will keep the A-key of the device in the event the device is reactivated. Once the telematics device is reactivated, the telematics device retrieves or regenerates the initial authentication bypass key which is stored in the computer readable medium of the telematics device or can be regenerated from the A-key. Further, when the account is activated, the service provider updates the authentication data on its corresponding servers so that the initial authentication bypass key is restored. Once the telematics device is authenticated on the service provider's servers, the service provider may generate and assign a new authentication bypass key to the telematics device.

Figure 1:
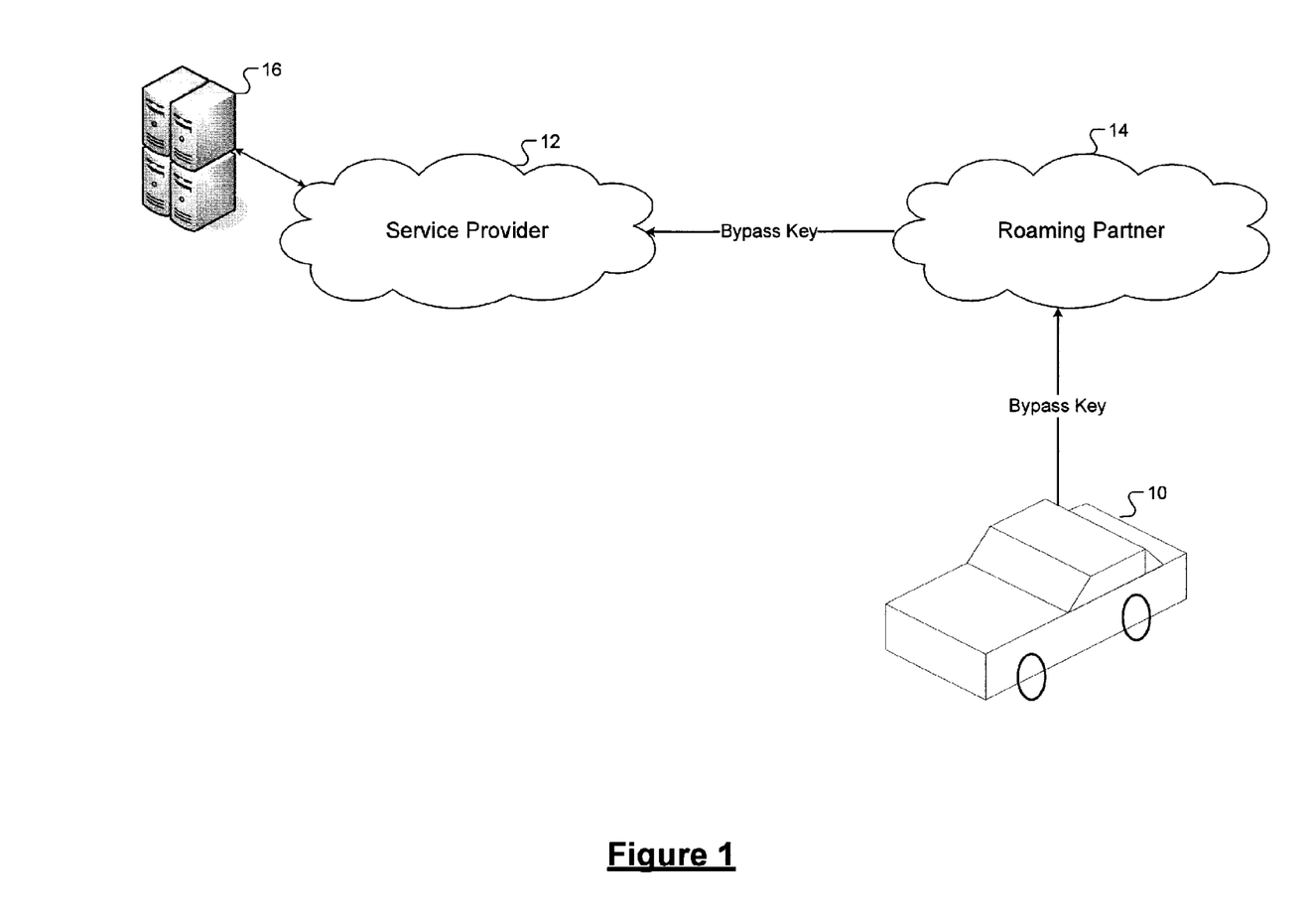
FIG. 1 is a diagram depicting an exemplary scenario when an authentication bypass key may be required.

FIG. 1 illustrates an exemplary situation when an authentication bypass key is used. In this example, the telematics device 10 (represented by a vehicle) is outside the footprint, or area of coverage, of the service provider 12. To make a data call, the telematics device must communicate with the service provider 12 via a roaming partner 14. The telematics device 10 will send the authentication bypass key to the service provider 12 via the routing partner 14. This communication may also include additional authentication data, such as a device identifier, a device group identifier, or other data used to indicate the device requesting a data call and/or a protocol used to make the data call. When the service provider 12 receives the authentication bypass key and the device authentication data, it will verify that the authentication bypass key matches an authentication bypass key stored in a server 16 of the service provider 12. If a match exists, the telematics device 10 is authenticated and is allowed to commence the data call.

Figure 2:
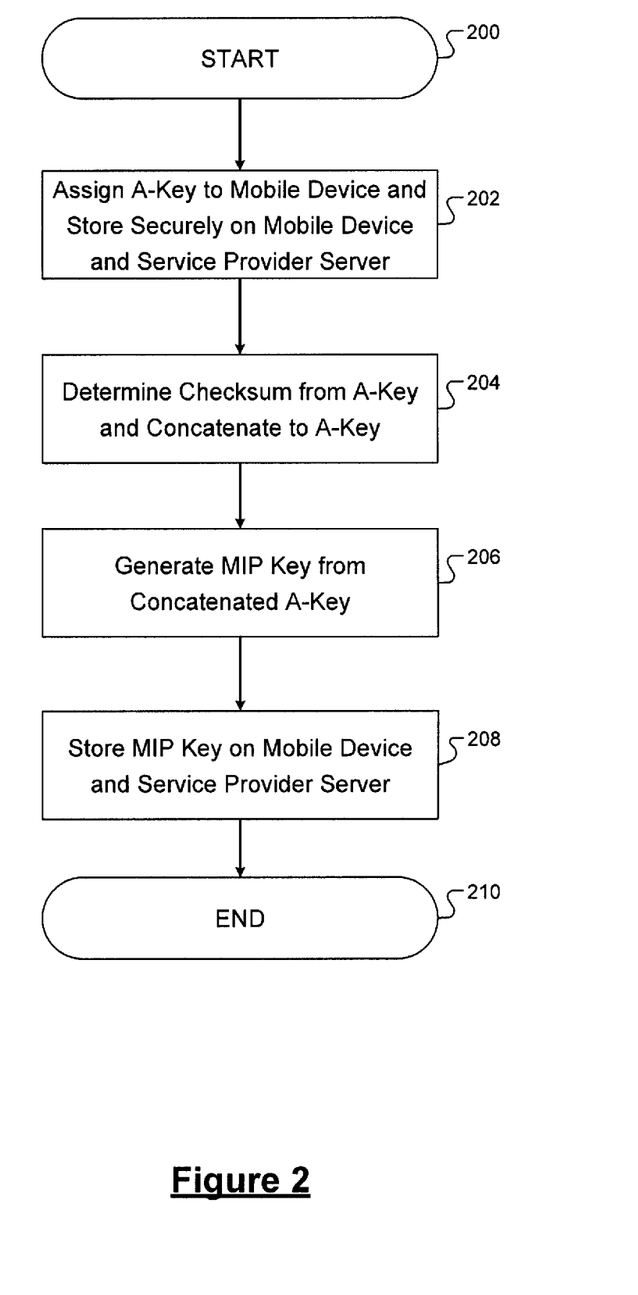
FIG. 2 is a flow chart depicting an exemplary method to generate an authentication bypass key.

When the initial data call made by the telematics device is made outside the service provider's footprint 12, an initial authentication bypass key must be agreed upon by the telematics device 10 and the service provider 12 in advance. FIG. 2 illustrates an exemplary method for facilitating authentication bypass when the initial data call made by the telematics device 10 is made outside of the service provider's footprint 12. Initially when the telematics device 10 is manufactured, the manufacturer or the service provider will assign a unique A-key to the device, as shown at step 202. An A-key is a secret number assigned to a device that is used in conjunction with a subscriber's other proprietary or secret data to authenticate the telematics device. While it is appreciated that the A-key may vary in length, for exemplary purposes the A-key will be referred to as being comprised of 20 digits. A copy of the A-key is stored on the server 16 of the service provider 12 as well.

A checksum can be generated from the A-key using a checksum function. The checksum algorithm receives the 20 digit number and generates a 6 digit checksum. In some embodiments, the checksum is concatenated to the A-key, as shown at step 204. The resulting 26 digit number is stored on the computer readable medium associated with the telematics device and on the server 16 of the service provider 12. It is appreciated that this step may be performed when the telematics device 10 is manufactured or upon activation of the telematics device 10. While a checksum algorithm is contemplated, it is further envisioned that any algorithm that receives a string of predetermined length and generates a second string of predetermined length can be used. Furthermore, it is appreciated that the 20 digit key can be combined with the checksum in various ways, including concatenating the A-key to the checksum, or the checksum can be added to or subtracted from the A-key.

The resulting 26 digit number described above can then be hashed using a hash function to generate an initial authentication bypass key, as shown at step 206. In exemplary embodiments the initial authentication bypass key is a 128 bit key that can be communicated to a roaming partner 14 by the telematics device 10 to bypass authentication of said telematics device 10. In some embodiments, the MD5 algorithm is used to generate the 128 bit authentication bypass key. While the MD5 algorithm is contemplated, it is appreciated that any hash function that yields a low amount of collisions or no collisions may be used. The resulting 128 bit key is stored on the computer readable medium associated with the telematics device as well as the server 16 of the service provider 12, as depicted at step 208.

The foregoing method may entirely be performed prior to shipping the telematics device 10. Alternatively, the portions of the method may be executed upon activation of the telematics device 10. For example, the A-key is typically assigned to the telematics device prior to shipping. The following steps, including generating a checksum and an authentication bypass key may be performed upon activation of the telematics device 10. Furthermore, as the outputs of checksum function and the hash function are repeatable, the calculation of the checksum and the initial authentication bypass key may be performed independently by the telematics device 10 as well as the server 16 of the service provider 12. Thus, when the telematics device is shipped all that needs to be known to the telematics device 10 and server 16 is the A-key. Upon activation of the telematics device 10, a processor of the telematics device 10 may compute the checksum and the initial authentication bypass key. Similarly, upon the activation of an account, the server 16 may also calculate a corresponding checksum and initial authentication bypass key.

When the first data call made by the telematics device 10 is made from outside the footprint of the service provider 12, the telematics device 10 retrieves the initial authentication bypass key and communicates it to the roaming partner 14, which in turn communicates the initial authentication bypass key to the service provider. It is envisioned that other data such as a group identifier and a device identifier may also be transmitted to service provider 12 via the roaming partner 14. The service provider can check that a correct group identifier and device identifier was received. If the group corresponding to the group identifier is provisioned for authentication bypass, then the initial authentication bypass key is verified on the server 16 of the service provider 12, thereby authenticating the telematics device 10. Once the telematics device 10 is authenticated by the service provider 12, the telematics device 10 is permitted to commence a data call via the roaming partner 14.

Figure 3A:
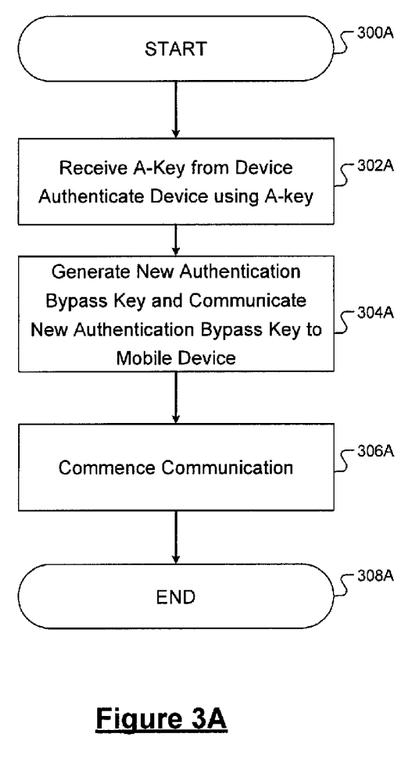
FIGS. 3A and 3B are flow charts depicting exemplary methods to be performed by a server and telematics device to obtain a new authentication bypass key.
Figure 3B:
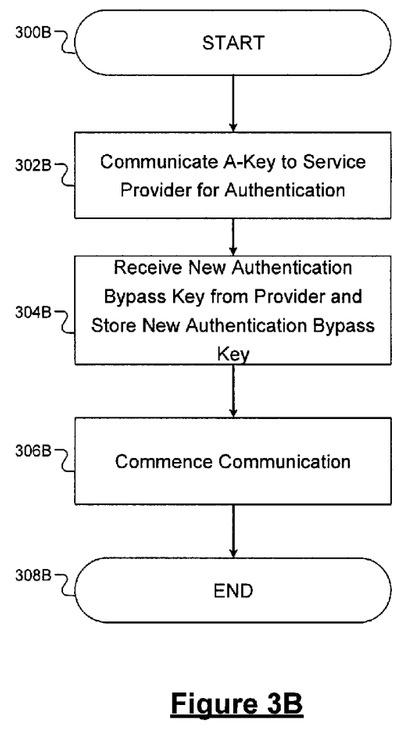

If a call is made within the footprint of the service provider, an authentication bypass key is not required. Further, when authentication is performed by the service provider, a new authentication bypass key can be assigned to the telematics device 10. FIGS. 3A and 3B depict an exemplary method for authenticating a user and assigning a new bypass key. FIG. 3A illustrates a method that may be executed by the server 16 of the service provider 12 and FIG. 3B illustrates a method that may be executed by the telematics device. The following methods can be executed when the telematics device 10 is in the footprint of the service provider.

A user may attempt to make a data call from the telematics device. Upon initiating the data call, the telematics device 10 will communicate authentication data to the server 16 via a secure communication channel, as depicted at step 302B. The authentication data may include the secret A-key of the telematics device 10 and other authentication data including but not limited to a device identifier and a device group identifier. The service provider 12 receives the A-key and performs authentication of the device, as shown at step 302A. It is appreciated that any authentication technique can be used.

Once authentication is performed, the server 16 of the service provider 12 can generate a new authentication bypass key, as shown at step 304A. The new authentication bypass key can be generated using various techniques. For example, the new authentication bypass key may be randomly assigned. Alternatively, a current or previous authentication bypass can be hashed and the resulting output can be the new key. In some embodiments, the server may use data such as the current time, the location of the device, or random numbers to generate the new authentication bypass key. Once generated, the server communicates the new authentication bypass key to the telematics device. The telematics device 10 receives the new authentication bypass key, verifies to the server that the new authentication bypass key was received and not corrupted, and stores the new authentication bypass key in the computer readable medium associated with the telematics device 10. Once the server receives verification that the telematics device 10 received the new authentication bypass key, the server can store the new authentication bypass key. After authentication has been performed, the service provider 12 can allow the telematics device 10 to commence the data call, as shown at steps 306A and 306B.

It is appreciated that the foregoing method is exemplary and alternative means of assigning a new authentication bypass key to a telematics device 10 are within the scope of the disclosure. Further, it is envisioned that the assignment of a new authentication bypass key can be performed after every authentication performed from within the footprint of the service provider or after a predetermined amount of authentications. Similarly, the new authentication bypass key can be assigned after a predetermined time period.

During the lifetime of the telematics device 10, the device may be deactivated one or more times. For instance, the original owner of the vehicle may not desire to have the data call service and, thus, may deactivate the data call service on the telematics device 10. As can be appreciated, the service provider will likely remove all data pertaining to the deactivated telematics device from its servers except for the A-key and data specific to the hardware of the device, such as the device identifier and the device group identifier. Upon selling the vehicle, the new owner may wish to reactivate the telematics device. Accordingly, an issue arises when the new owner attempts to make the initial data call from outside the footprint of the service provider because the most recent authentication bypass key stored on the telematics device 10 may not have a corresponding authentication bypass key on the server 16 of the service provider. To solve this problem, upon reactivation, both the service provider 12 and the telematics device 10 revert to a previously agreed upon authentication bypass key, e.g. the initial authentication bypass key, to perform authentication bypass when the first data call is outside of the service provider's footprint. After a data call is made within the service provider's footprint, a new authentication bypass key can be assigned concurrent with the methods described above.

Figure 4A:
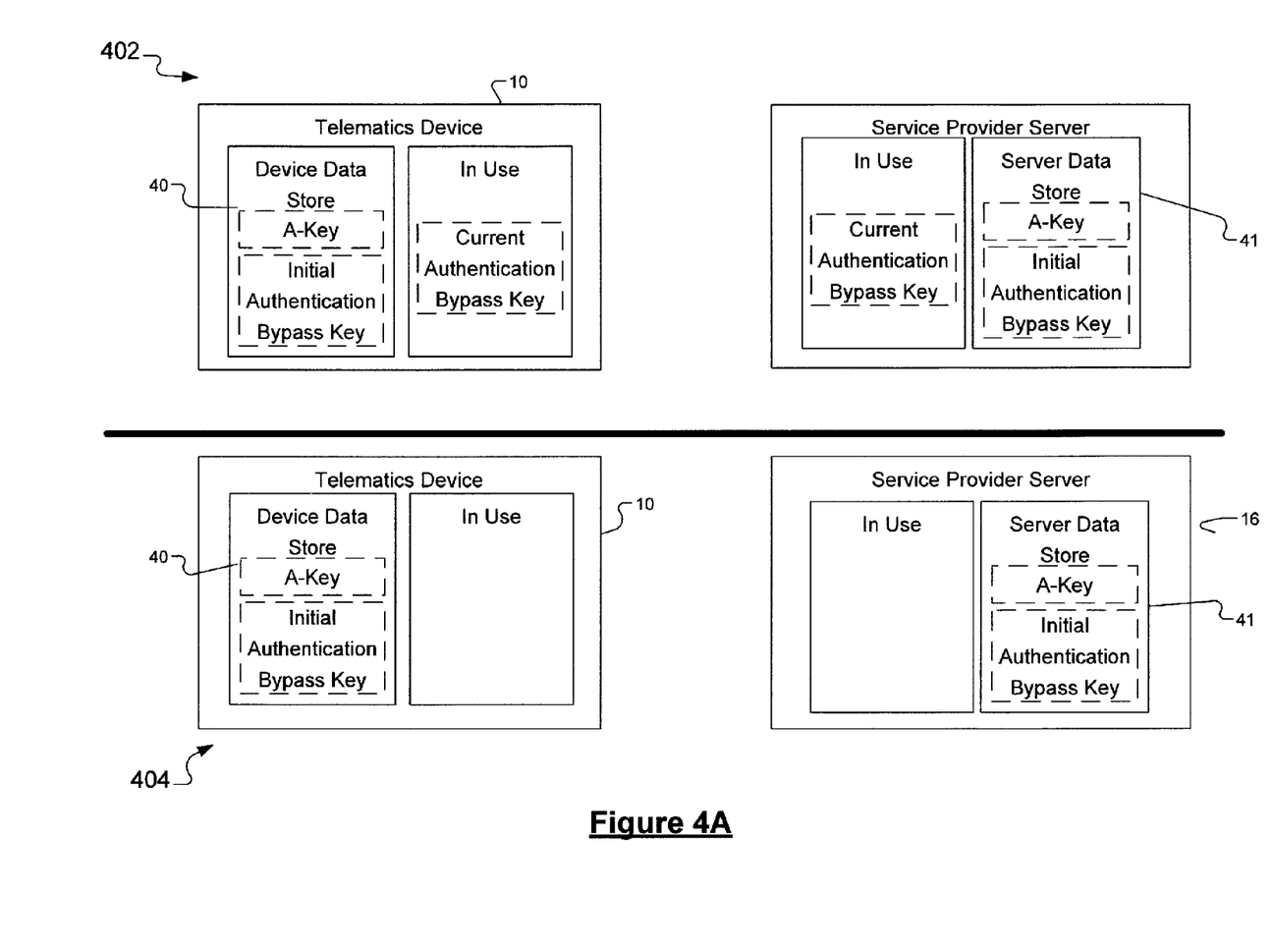
FIGS. 4A and 4B are a state diagram of a data store of a telematics device and server at various points throughout the lifetime of the telematics device.
Figure 4B:
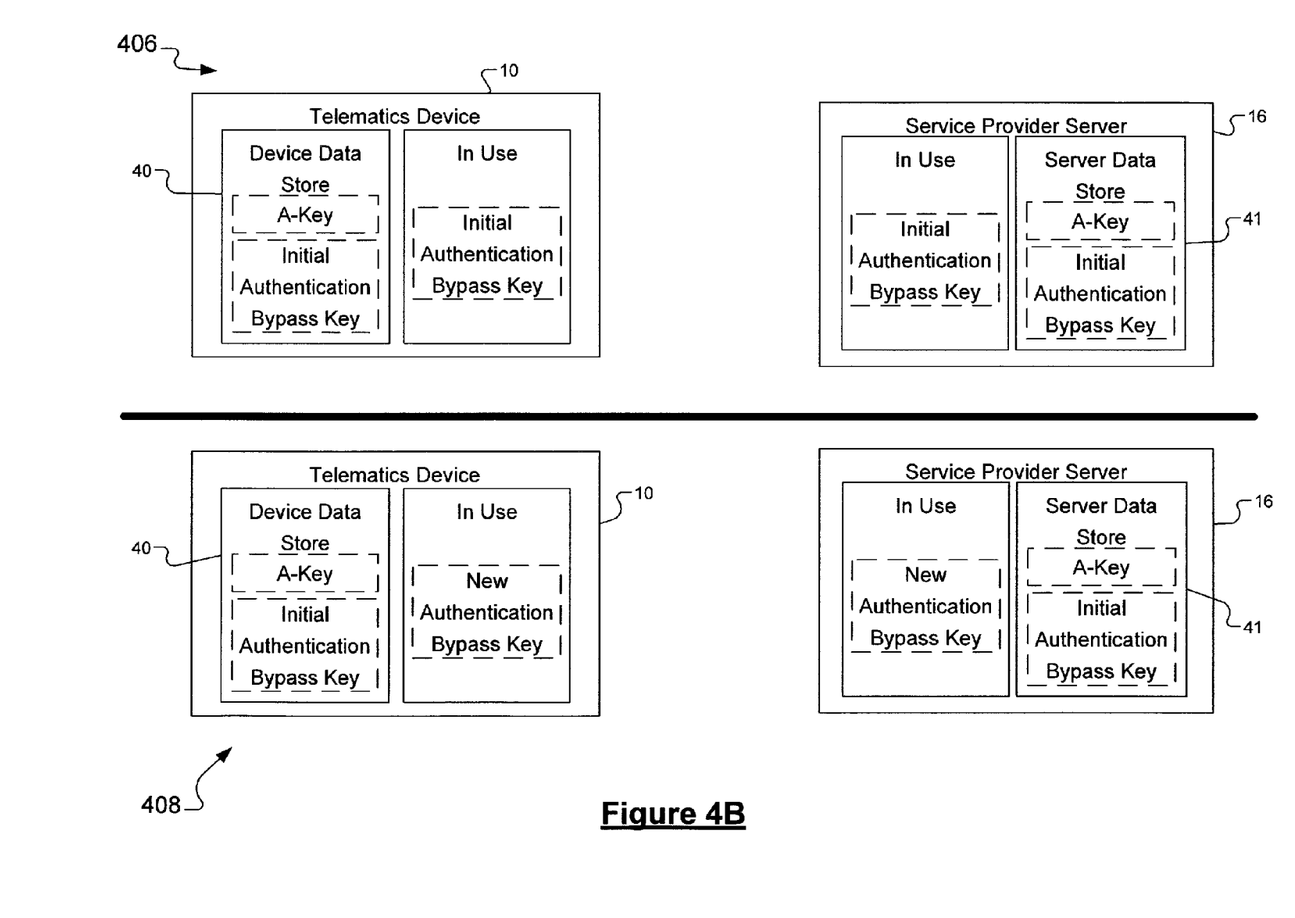

FIG. 4 illustrates exemplary states of the telematics device 10 and the server at various points in time, including the last data call made prior to deactivation, when the device has been deactivated, the first call made outside of the service provider's footprint after reactivation, and after the first call is made after reactivation.

In the first state 402, the telematics device 10 is yet to be deactivated. Stored on the computer readable medium of the device (the "device data store") is the A-key and optionally the initial authentication bypass key. Further, a current authentication bypass key may be stored on telematics device 10 as well as to perform authentication bypass. Correspondingly, the current authentication bypass key is the key in use on the server 16 of the service provider 12. Stored on a computer readable medium of the server 16 or another server associated with the service provider 12 (a "service provider data store") is the A-key of the telematics device 10 and optionally the initial authentication bypass key.

Upon deactivation, as shown at state 404, the telematics device 10 will keep the A-key and optionally the initial authentication bypass key stored in the device data store 40. The telematics device 10 may purge any records relating to the current authentication bypass key from the data store. Similarly, the service provider stores the A-key of the device and optionally the initial authentication bypass key on the service provider data store. The current authentication bypass key may be purged from the service provider datastore.

At state 406 the telematics device 10 has been reactivated by the user. As can be seen, the initial authentication bypass key is restored as the bypass key on the telematics device 10 and on the server 16. In the embodiments where the bypass key is stored, the initial authentication bypass key is retrieved from the device data store and the service provider data store. Alternatively, the telematics device and the service provider may agree upon and thus store another previously used authentication bypass key that was used prior to deactivating the device. For example, the most recently used authentication bypass key may be used as the authentication bypass key upon reactivation.

In embodiments where only the A-key is stored, the initial authentication bypass key can be recalculated according to the methods described above and shown in FIG. 2. As can be appreciated, checksum algorithms and hash functions provide repeatable outputs, thus the device and the server will have symmetric authentication bypass keys.

Once a data call is made from within the footprint of the service provider 12, as shown at state 408, the service provider generates a new authentication bypass key, which is communicated to the telematics device 10. The telematics device 10 and the service provider use the new authentication bypass key as the bypass key until the service provider generates the next authentication bypass key.

The foregoing framework can be used to reactivate the telematics device 10 without requiring the telematics device 10 to make the first data call upon reactivation within the service provider's footprint.

Figure 5:
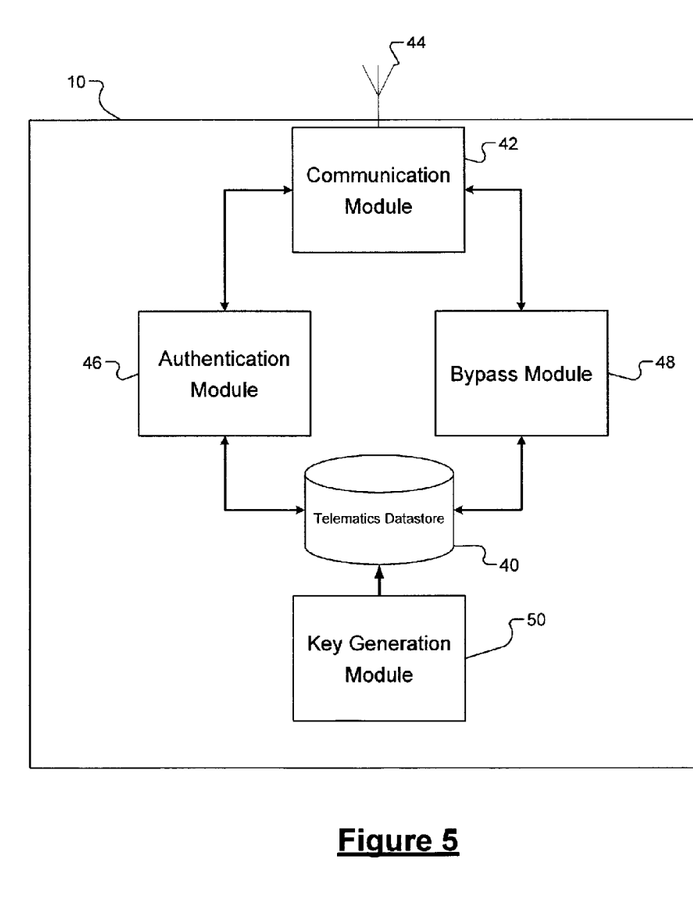
FIG. 5 is a block diagram depicting the exemplary components of a telematics device which are used for authentication.

FIG. 5 illustrates exemplary components of the telematics device 10 that are used to authenticate the device when making a data call. The telematics device 10 includes a communication module 42 which communicates with the service provider 12 or a roaming partner 14 of the service provider via an R/F antenna 34 or the like. The communication module 42 is configured to communicate with the service provider or a roaming partner thereof by transmitting and receiving data packets over a secure communication channel. The communication module 42 is further configured to determine if the telematics device 10 is within the footprint of the service provider 12 or if the telematics device 10 is in the footprint of a roaming partner 14, if the telematics device 10 is not within the footprint of the service provider 12.

If the telematics device 10 is in the footprint of the service provider 12, then authentication of the telematics device 10 is performed by an authentication module 46. Conversely, if the telematics device 10 is not within the footprint of the service provider 12 but is within the footprint of a roaming partner 14, then authentication is performed by a bypass module 48. Both the authentication module 46 and the bypass module 48 are in communication with a device datastore 40. The device datastore 40 is a computer readable medium storing data including, but not limited to, the A-key of the device, an initial authentication bypass key, a current authentication bypass key, a device identifier, and a device group identifier. It is understood that the computer readable medium may be a RAM, a hard-disk drive, a CD-ROM, a DVD-ROM, a solid state memory disk drive, or the like.

The authentication module 46 initiates authentication of the telematics device 10 when it is in the footprint of the service provider 12. It is envisioned that authentication can be performed using techniques known in the art. To perform authentication, the authentication module 12 may communicate the A-key, the device identifier and other authentication data over a secure communication channel to the server 16 of the service provider 12. Depending on the level of security of the communication channel, the A-key may be encrypted prior to transmission. Using the A-key and the additional authentication data, the server 16 can authenticate the device and allow the data call to proceed. Additionally, the authentication module 46 may be further configured to authenticate the service provider 12. Thus, the authentication module 46 may receive service provider specific authentication data from the server 16 to validate that identity of the service provider 12 prior to commencing the data call.

Furthermore, as discussed above, when authentication is performed, the service provider 12 may transmit a new authentication bypass key. The authentication module 46 receives the new authentication bypass key via the communications module 42 and sends a verification to the service provider 12 that the new authentication bypass key was received. The authentication module 46 stores the new authentication bypass key in the device data store 40.

The bypass module 48 is configured to initiate authentication of the telematics device 10 when the telematics device 10 is in a footprint of a roaming partner 14. As can be appreciated, the service provider 12 may have its own proprietary processes for performing authentication of the telematics device 10, which it may not want to outsource to the roaming partner. Thus, when a data call is initiated from outside of the footprint of the service provider 12, the bypass module 48 retrieves the current authentication bypass key from the device data store 40 and communicates the current authentication bypass key to the service provider 12 via the roaming partner 14. The bypass module 48 may further communicate additional data such as the device identifier and the device group identifier to the service provider 12 via the roaming partner 14. The service provider receives this data and upon confirmation of the devices identity using the authentication bypass key and the authentication data, the service provider allows the roaming partner to commence the data call.

Also shown in FIG. 5 is a key generation module 50 that is configured to generate an authentication bypass key from the A-key. The key generation module 50 retrieves the A-Key from the device datastore 40 and generates the initial authentication bypass key according to the methods described above. Furthermore, the key generation module 50 is configured to reset the authentication bypass key upon reactivation of the telematics device 10. For instance, the key generation module 50 may recalculate the initial authentication bypass key 50 if the bypass key is not stored in the device datastore 10 after deactivation.

It is appreciated that additional components may be required to actually perform the data call, such as audio inputs/outputs, a touch screen, video output, etc.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method for reactivating a telematics device configured to make a data call via a roaming partner of a service provider, the service provider having an authentication bypass feature which uses an authentication bypass key common to the telematics device and the service provider to allow the telematics device to make a data call through the roaming partner without authentication, the method comprising:

setting the authentication bypass key on a server of the service provider equal to a previous authentication bypass key, wherein the previous authentication bypass key was used by the authentication bypass feature prior to deactivation of the telematics device;

setting the authentication bypass key on the telematics device equal to the previous authentication bypass key;

commencing the data call through the roaming partner by sending the authentication bypass key to the service provider from the telematics device via the roaming partner, wherein the previous authentication bypass key is an initial authentication bypass key known to the telematics device and the service provider prior to initial activation of the telematics device; the initial authentication bypass key is determined prior to activation of the telematics device by:

calculating a checksum using a checksum function that receives an A-key of the telematics device as input;

concatenating the checksum to the A-key of the telematics device; and hashing the result of said concatenating using a hash function; wherein said initial authentication bypass key is an output of said hash function.

2. The method of claim 1 wherein the initial authentication bypass key is stored on a computer readable medium associated with the telematics device and a computer readable medium associated with the server of the service provider such that setting the authentication bypass key on said telematics device and on said server includes retrieving the initial authentication bypass key from the computer readable medium associated with the telematics device and from the computer readable medium associated with the server.

3. The method of claim 1 wherein said A-key of the telematics device is stored on a computer readable medium associated with the telematics device and on a computer readable medium associated with the server of the service provider such that upon reactivation of the telematics device, both the server and the telematics device perform steps comprising:
- calculating a checksum using the checksum;
- concatenating the checksum to the A-key of the telematics device;
- hashing the result of said concatenating using the hash function; and
- setting the authentication bypass key to the output of said hash function.

4. A telematics device configured to make a data call via a roaming partner of a service provider, the service provider having an authentication bypass feature which uses an authentication bypass key common to the telematics device and the service provider to allow the telematics device to make a data call through the roaming partner without authentication, the device comprising:
- a communications device receiving a signal through an antenna to reactivate the telematics device;
- a key generation module generating the authentication bypass key of the telematics device equal to a previous authentication bypass key, wherein the previous authentication bypass key was used by the authentication bypass feature prior to deactivation of the telematics device, the previous authentication bypass key is an initial authentication bypass key known to the telematics device and the service provider prior to the initial activation of the telematics device, wherein the service provider resets a corresponding authentication bypass key to the previous authentication bypass key;
- an authentication bypass module communicating the authentication bypass key to the roaming partner, wherein the service provider allows the telematics device to make the data call upon verifying that the authentication bypass key corresponds to the corresponding authentication bypass key; and
- the key generation module calculates the initial authentication bypass key prior to activation of the telematics device, such that the key generation module is configured to:
  a) calculate a checksum using a checksum function that receives an A-key of the telematics device as input;
  b) concatenate the checksum to the A-key of the telematics device; and
  c) hash the result of said concatenating using a hash function, wherein said initial authentication bypass key is an output of said hash function.

5. The device of claim 4 further comprising a device data store storing the initial authentication bypass key such that upon receiving a signal to reactivate the device the key generation module retrieves the initial authentication bypass key from the device data store.

6. The device of claim 4 further comprising a device data store storing the A-key of the telematics device such that upon receiving a signal to reactivate the device the key generation module is configured to:
  a) calculate a checksum using the checksum function;
  b) concatenate the checksum to the A-key of the telematics device;
  c) hash the result of the concatenation using the hash function; and
  d) set the authentication bypass key to the output of the hash function.

* * * * *